United States Patent
Barrus et al.

(10) Patent No.: US 7,580,164 B2
(45) Date of Patent: Aug. 25, 2009

(54) DOCUMENT SEPARATOR PAGES

(75) Inventors: John Barrus, Menlo Park, CA (US); Kurt Piersol, Campbell, CA (US); Steve Savitzky, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 977 days.

(21) Appl. No.: 11/023,208

(22) Filed: Dec. 22, 2004

(65) Prior Publication Data

US 2006/0136450 A1 Jun. 22, 2006

(51) Int. Cl.
*H04N 1/04* (2006.01)
*B65H 5/22* (2006.01)

(52) U.S. Cl. .................... 358/474; 271/3.04

(58) Field of Classification Search ............... 358/1.12, 358/403, 498, 496, 474, 1.18; 271/278, 280, 271/291, 10.06, 3.04, 4.01; 715/255, 205, 715/234, 256, 265, 743, 744, 745, 746, 760; 709/217; 707/500, 501, 502, 531; 345/200.49, 345/153; 705/1, 2, 3, 4, 50, 51; 369/47.1, 369/47.12
See application file for complete search history.

(56) References Cited

U.S. PATENT DOCUMENTS

| | | | |
|---|---|---|---|
| 5,129,016 A | 7/1992 | Murakami et al. | |
| 5,247,591 A | 9/1993 | Baran et al. | |
| 5,465,167 A | 11/1995 | Cooper et al. | |
| 5,781,914 A | 7/1998 | Stork | |
| 5,819,261 A * | 10/1998 | Takahashi et al. | 707/3 |
| 6,173,274 B1 * | 1/2001 | Ryan, Jr. | 705/408 |
| 7,023,861 B2 * | 4/2006 | Makinson et al. | 370/401 |
| 7,456,981 B2 * | 11/2008 | Kuboki | 358/1.13 |
| 7,478,324 B1 * | 1/2009 | Ohtsu | 715/255 |
| 2003/0025951 A1 | 2/2003 | Pollard et al. | |
| 2004/0078337 A1 | 4/2004 | King et al. | |
| 2005/0022122 A1 * | 1/2005 | Barrus et al. | 715/530 |
| 2005/0223331 A1 * | 10/2005 | Wolff et al. | 715/744 |
| 2006/0133670 A1 * | 6/2006 | Barrus et al. | 382/173 |
| 2007/0201768 A1 * | 8/2007 | Schiehlen | 382/309 |

FOREIGN PATENT DOCUMENTS

EP 0940970 A2 9/1999

OTHER PUBLICATIONS

European Search Report dated Mar. 3, 2006. 6 pages.

* cited by examiner

*Primary Examiner*—Jerome Grant, II
(74) *Attorney, Agent, or Firm*—Blakely, Sokoloff, Taylor & Zafman LLP

(57) ABSTRACT

A method, apparatus, and article of manufacture for using document separator sheets is described. In one embodiment, the method comprises scanning a plurality of sheets having a plurality of documents to be added to one or more collections, identifying the start of each of the plurality of documents based on a separator page preceding each of the plurality of documents, and adding the plurality of documents to the one or more collections.

35 Claims, 11 Drawing Sheets

DOCUMENT SEPARATOR PAGES

FIELD OF THE INVENTION

The present invention relates to the field of document processing, more particularly, the present invention relates to adding documents and other media objects to collections using separator sheets.

BACKGROUND OF THE INVENTION

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. Oftentimes, many copies of a document must be made so that the document can be shared among colleagues, thus generating even more paper.

To that end, multi-function peripherals (MFPs) have been developed to perform multiple functions on paper documents, including copying, printing, scanning, and transmitting documents. Each MFP usually has a display through which a user may control the MFP and see status of the operation(s) being performed by the MFP. This control includes the selection of finishing options with respect to print operations that the MFP is to perform. These finishing options include such functions as specifying the orientation of the document image to be printed, the number of documents to be printed per sheet, the staple angle and location, the punch style, as well as others.

Cover sheets and separator pages have been used extensively for routing, distributing, packing, and mailing materials in the past. U.S. Pat. No. 5,659,164 discusses the use of document separators for scanning in multiple documents at once. Also U.S. Pat. No. 5,115,326 describes the use of a coversheet in a fax to route a fax to an email address.

Collections of documents may be created on an MFP Collection Manager system as described in U.S. application Ser. No. 10/404,927, filed Mar. 31, 2003, entitled "Multimedia Document Sharing Method and Apparatus," published Sep. 30, 2004 (publication no. 20040193571) are represented by a single collection coversheet. On the coversheet, every scanned page is shown separately. That is, all 100 pages of a 100 page document are displayed and each scanned page is stored separately. Although the entire document could be printed by printing the collection, it is time-consuming and inconvenient to save the document on your local computer or to browse through the document since the pages are all stored as separate scanned images. For more information on the MFP Collection Manager, see U.S. patent application Ser. No. 10/404,916, filed Mar. 31, 2003, entitled "Method and Apparatus for Composing Multimedia Documents," published Sep. 30, 2004 (publication no. 20040194026).

One convenient feature of MFP collections is the ability to represent hierarchies of collections. One collection can contain one or more subcollections. To add a collection to another collection, in the prior art, a user can place one collection coversheet behind the coversheet of another collection (the container collection), place those collections in the document feeder and press a button on the MFP. Thus, creation of a hierarchy of collections requires at least two separate steps. That is, in order to add a subcollection to a new collection, the subcollection must be created first and then the coversheet of the subcollection added to another collection.

Xerox FlowPort™ and Xerox European Research Centre's Knowledge Pump (KP) are two known document processing systems that allow documents to be entered into a system. Knowledge Pump is based on Xerox's Flowport™ software. In this system, paper forms are constructed that allow users to submit hardcopy documents. Using a combined printer/scanner/copier next to the large screen, the users are able to place a sheet on top of the document and press the start button on the copier. The sheet is recognized as introducing a new document. Thereafter, automatically, the document is scanned, OCR'ed and then the keywords in the OCR'ed document are analyzed to decide to which community it is best suited. Users have the option to override the automatic classification using a web interface. For more information, see Snowden, D. and Grasso, A. (2002) Diffusing Information in Organisational Settings: Learning from Experience. In *Proceedings of CHI'02*, *Minneapolis, Minn.*

The Xerox FlowPort system uses coversheets or document catalogs. Specifically, the Flowport form allows the submission of a single document to a database and allows the user to attach handwritten notes to the document, as well as assign classifications and rank the document in terms of level of interest.

However, in the Knowledge Pump application described above, there is only a single set of documents or database and all documents go into the same database. With Knowledge Pump, there is no indication of the ability to add multiple documents to a collection at once. They use a "cover sheet" rather than a "document separator". The sheet used in Knowledge Pump indicates that all following pages belong to the document that is being submitted. Furthermore, the Knowledge Pump and Flowport cannot contain hierarchies of documents.

Batch processing and punch cards were one of the earliest methods for inputting data and programs into a computer. However, batch processing and punch cards do not provide collection coversheets or other indices to collections in storage, nor do they show hierarchies of a collection.

SUMMARY OF THE INVENTION

A method, apparatus, and article of manufacture for using document separator sheets are described. In one embodiment, the method comprises scanning a plurality of sheets having multiple documents to be added to one or more collections, identifying the start of each of the plurality of documents based on a separator page preceding each of the plurality of documents, and adding the plurality of documents to the one or more collections.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
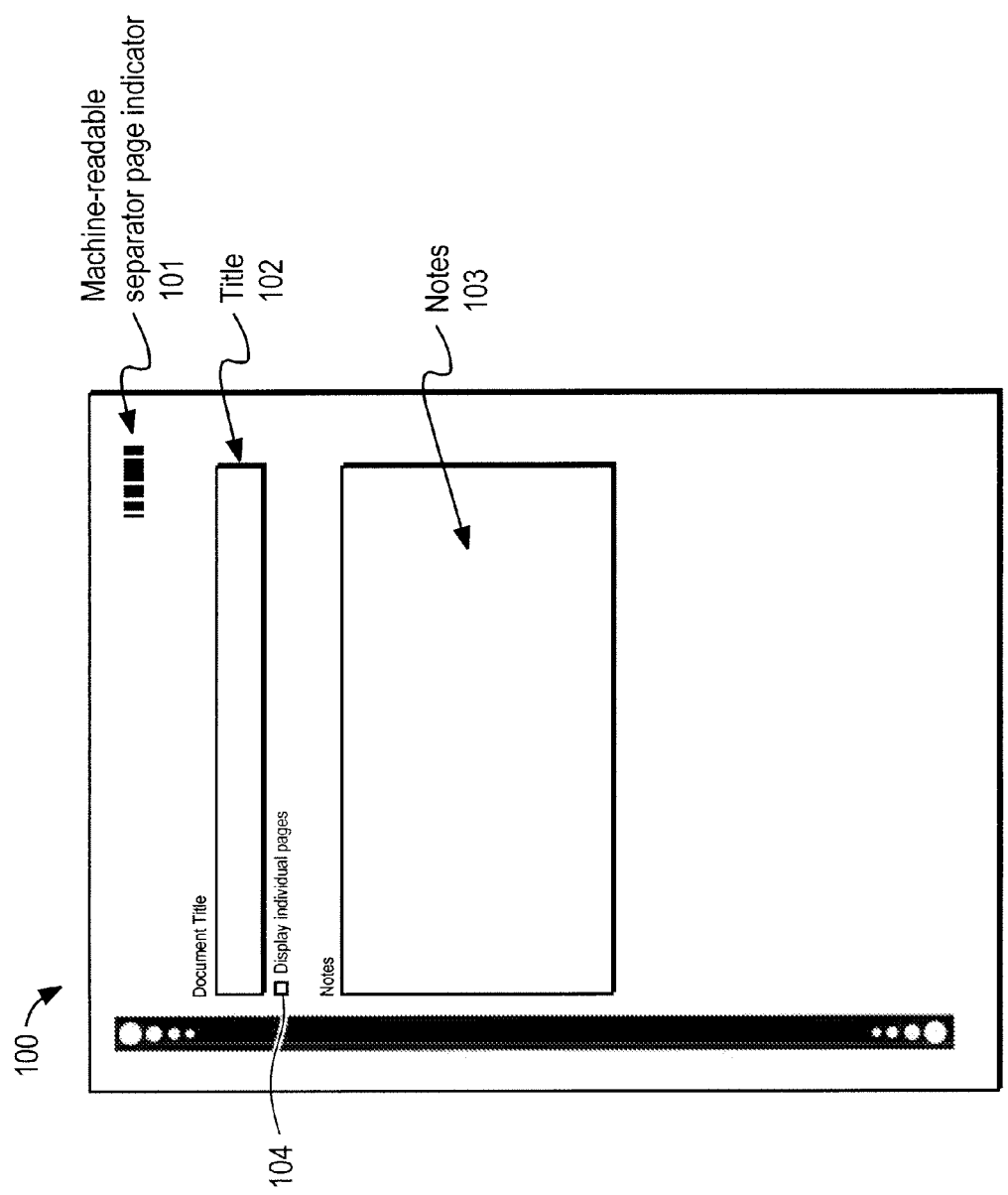
FIG. 1 is an exemplary document separator page.

Methods and apparatuses for using document and collection separator sheets are described. Document separator sheets are used to add documents to collections of media objects (e.g., documents), while collection separator sheets are used to add subcollections of documents to collections of media objects. In one embodiment, the method comprises scanning several pages containing documents to be added to one or more collections, identifying the start of each of the documents based on a separator page preceding each of the documents, and adding the documents to the one or more collections.

In one embodiment, the collections are represented with cover sheets. The cover sheet provides access to and management of a collection of arbitrary media objects through the use of an identifier (e.g., a machine-readable identifier, such as, for example, a barcode). Media objects may include scanned documents, images, audio files, text notes, annotations (drawing marks), web pages, and office documents like spreadsheets and presentations. The media objects may be represented by a set of thumbnails on the cover sheet. Other representations may be used.

The terms "paper," "paper medium," or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

Collections in this specification have a specific meaning. A "collection" can include one or more groups of electronic documents or media which might include digital images, audio recordings, scanned images from pages of a document, files like Microsoft Word documents or Microsoft Excel spreadsheets. Collections can also contain pointers to other collections. Collections can include user-provided markings, annotations, and such. Collections can also include metadata representing related information such as date of creation, modification date, access permissions, and so on.

A collection is stored on a collection server and has a specific address or identifier, similar to a URL or uniform resource locator, which identifier is unique and provides a pointer to the collection. A collection has a coversheet that displays a representation of the contents of the collection with an overview image showing thumbnails that represent all of the documents in the collection. More details about collections will be described in another part of this specification.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In this application, the following terms are used:

"Document" refers to any collection of information capable of being stored electronically, including but not limited to text, word processing and spreadsheet files, e-mail messages, voice and audio recordings, images, archives of documents, and video recordings.

"Identifier sheet" refers to a piece of paper or other readable media item that identifies a stored document or collection of documents. As described in above-reference related patent applications, the identifier sheet may be a collection cover sheet or may take on any other form. In one embodiment, the identifier sheet includes a document identifier and/or collection identifier that may be computer-readable, human-readable, or any combination thereof. Identifier sheets are also referred to herein as "document indexes."

One type of identifier sheet is a "collection coversheet." A collection coversheet identifies a collection and also includes representations of documents within the collection. In one embodiment, a collection coversheet includes:

A collection identifier in machine-readable form (such as a barcode) and/or human-readable form (such as a Uniform Resource Locator (URL) or other text string). The collection identifier provides information describing a location of the collection, such as a directory or folder containing documents in the collection.

A collection overview, which represents documents in the collection by thumbnails. Thumbnails are associated with positions in the overview. For instance, the thumbnail for document A might be in the upper left corner of the collection overview, and the thumbnail for document B might be in the lower right corner.

Further description of collection coversheets, collection identifiers, and collection overviews can be found in related patent applications referenced herein and are discussed in more detail below, such as U.S. patent application Ser. No. 10/404,916, filed Mar. 31, 2003, entitled "Method and Apparatus for Composing Multimedia Documents," published Sep. 30, 2004 (publication no. 20040194026) and U.S. patent application Ser. No. 10/404,927, filed Mar. 31, 2003, entitled "Multimedia Document Sharing Method and Apparatus," published Sep. 30, 2004 (publication no. 2004/0193571).

Document Separators

In one embodiment, to add a stack of pages to a collection, a system (e.g., an MFP) identifies when the end of one document was reached and a new document begins. One advantage of knowing boundaries between documents is that each document can be represented in a collection by a single thumbnail and a PDF can be created containing all the pages of one document. In one embodiment, one entire document can be printed out with a single request and sent by email as a single attachment.

The system creates collections of paper documents. When a stack of pages is inserted into the system's automatic document feeder, the pages are scanned and added to a new collection. By inserting a document separator page at the beginning of each document, it is possible for the system to find the boundaries between documents. Using the document separator page, the system determines with 100% certainty which page is the end of a document or beginning of a new one by looking at the images of scanned pages.

In one embodiment, each document is represented in the collection coversheet by a graphic (e.g., thumbnail) of the top page. That is, instead of having every scanned page represented separately on the collection coversheet and have each scanned page was stored separately, in one embodiment, each document is represented by a single graphic on the coversheet.

In one embodiment, a PDF is created that contains all the pages of the document, allowing easy emailing, printing or viewing of all the pages of one document. There are many software tools available for creating PDF files from scanned images. A single PDF can be created for that document when the computer can determine which pages belong to an individual document. The advantage of a PDF format is that a multi-page document is represented efficiently by a single file which can be read by many different computer systems. There are several other multi-page document representations well known in the art, including the relatively new JPM format and multi-page TIFF formats that may be used as well.

FIG. 1 is an exemplary document separator page. Referring to FIG. 1, document separator page 100 contains a machine-readable code 101 (e.g., bar code) that identifies itself to the system as a document separator page. In one embodiment, machine-readable code 101 is located in the upper right corner of document separator 100. In one embodiment, document separator page 100 also provides a user input area 102 for a user to add a title and/or an area 103 for the user to add additional comments. A user may write, type, or append material in areas 102 and 103. When document separator page 100 is scanned, the information, such a title is extracted from area 102, as an image and placed on the collection overview. Thus, the information is extracted from the area and added as a media object to the collection represented by the coversheet. In one embodiment, the title is extracted from area 102 are placed above the thumbnail of the first page of the document that follows document separator page 100 in the coversheet.

Notes or other annotations may also be added to the document using notes area 103. In one embodiment, an image of the notes area 103, if not blank, is placed next to the document, allowing the user to cause special notes about the document to appear in the coversheet.

In one embodiment, document separator page 100 also includes an area 104 (e.g., box) to receive an indication from a user as to whether or not the system is to display individual pages of the following document on the coversheet or represent the entire document with a thumbnail. Area 104 may be a checkbox. If the user checks the area 104 (e.g., the checkbox), thumbnails of all the document pages are added to the collection overview. In one embodiment, a PDF is created that contains all the pages of the document.

Note that the areas 102-104 may be any shape that facilitates their use with a user and the system.

Figure 2:
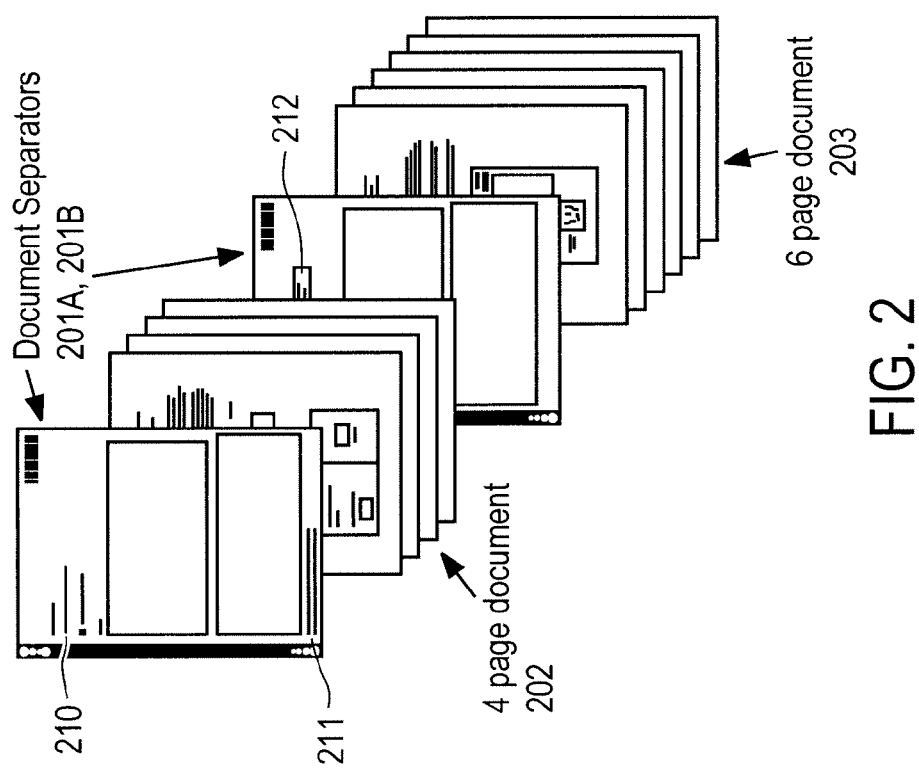
FIG. 2 is an example of using separator pages when creating a collection.

FIG. 2 is an example of using separator pages when creating a collection. Referring to FIG. 2, each of document separator pages 201A and 201B precedes documents 202 and 203, respectively. Document 202 is a multi-paged document (e.g., 4 pages), and document 203 is also a multi-paged document (e.g., 6 pages).

Document separator page 201A is a pre-printed separator page with the title "Invention Disclosure" 210. In one embodiment, preprinted separator pages have a machine-readable version of information about the document located on the document separator page. In the case of document separator page 201A, machine readable code 211 appears on the bottom of document separator page 201A and indicates the document title, "Invention Disclosure." In one embodiment, preprinted pages can be created from a web browser or at the system (e.g., the MFP). Document separator page 201B for document 203 has the words "Stamp Sheets" written in cursive in area 212 (i.e., the document title box). 100521

When using an MFP, a user places the 12 pages (2 documents and 2 separator sheets) on an automatic document feeder of the MFP and presses a "New Collection" button on the MFP. The MFP scans all 12 pages and determines that page 1 and page 6 contain document separator markings (e.g., bar codes) in the upper right corner. The MFP extracts the title information from both document separator pages 201A and 201B and creates thumbnail pages from pages 2 and 7, respectively, represent the two scanned documents 202 and 203, respectively.

Figure 3:
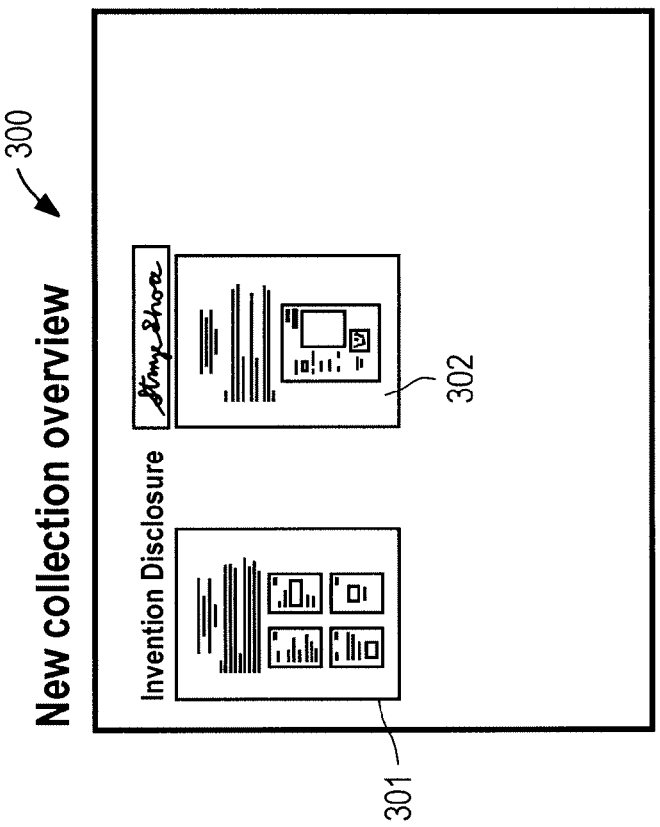
FIG. 3 illustrates a collection overview of the collection created using the pages shown in FIG. 2.

FIG. 3 illustrates a collection overview of the collection created using the pages shown in FIG. 2. Referring to FIG. 3, thumbnails 301 and 302 correspond to pages 2 and 7 of the 12 pages shown in FIG. 2. Thumbnails appear in the upper left corner of collection overview 300 created by the MFP. The title extracted from document separator page 201A, namely, "Invention Disclosure", appears above thumbnail 301, while the title extracted from document separator page 201B appears above thumbnail 302.

Note that, in one embodiment, if any notes had been included in the notes entry area (e.g., the notes box) of either of document separator pages 201A and 2011B, the MFP displays those notes as an image next to thumbnails 301 and 302, respectively.

Figure 4:
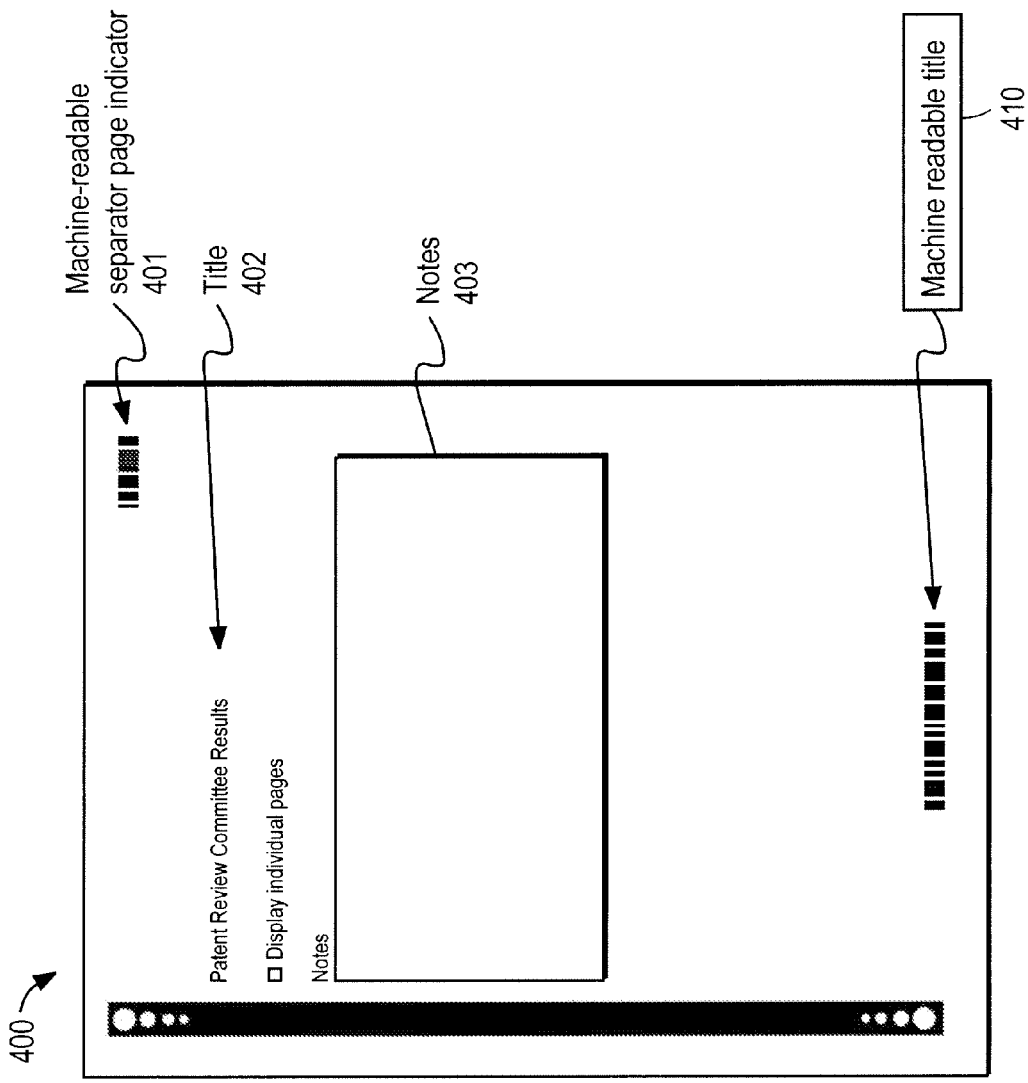
FIG. 4 is another example of a document separator page having preprinted information.

FIG. 4 is another example of a document separator page having preprinted information. Referring to FIG. 4, document separator page 400 includes a machine-readable (e.g., bar code) separator page indicator 401, a preprinted title 402, a notes (or other annotation) area 403, and a machine-readable (e.g., bar code) title 410 corresponding to preprinted title 402.

Figure 5:
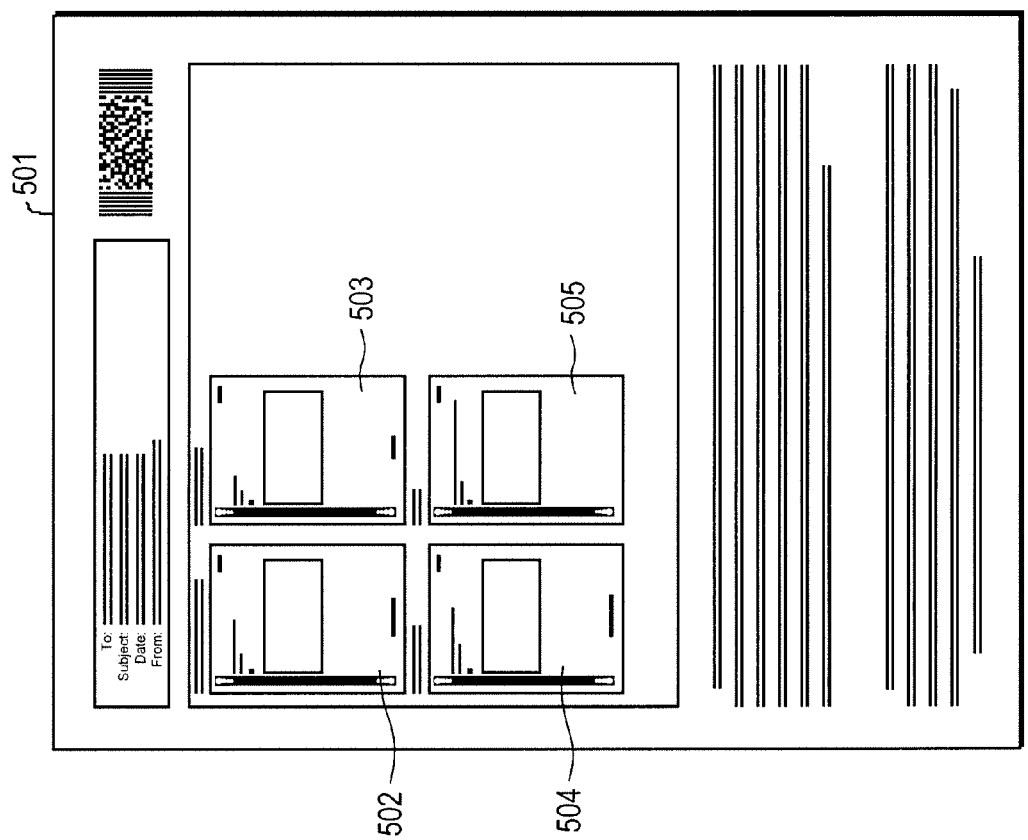
FIG. 5 is an example of a collection overview displaying a collection of preprinted separator pages.

FIG. 5 is an example of a collection overview displaying a collection of preprinted separator pages. Referring to FIG. 5, collection overview 501 includes preprinted separator pages 502-506.

Figure 6:
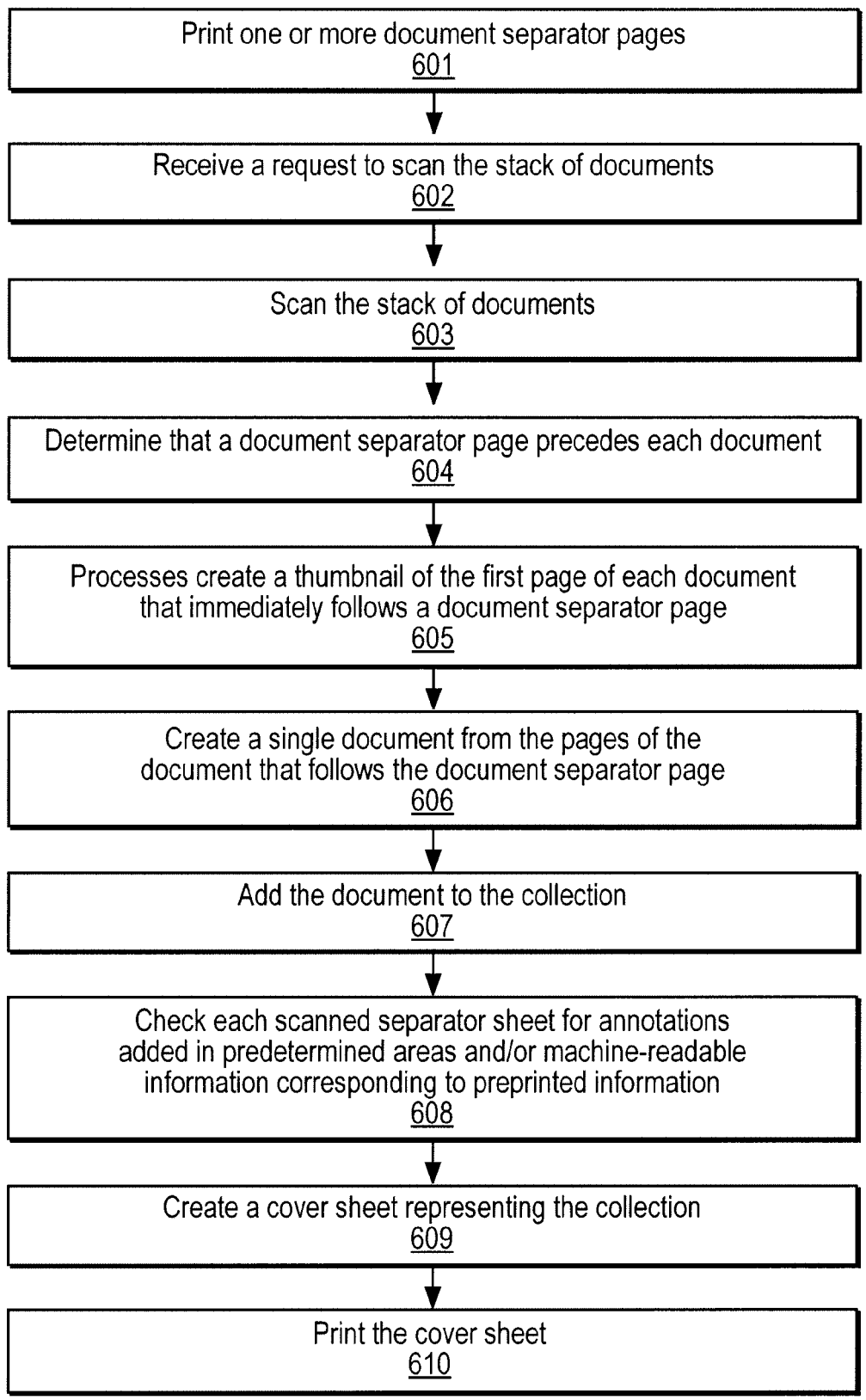
FIG. 6 illustrates one embodiment of a process for adding multiple documents to a collection.

FIG. 6 illustrates one embodiment of a process for adding multiple documents to a collection. The process is performed by processing logic that may comprise hardware (e.g., circuitry, dedicated logic, etc.), software (such as is run on a general purpose computer system or a dedicated machine), or a combination of both. In one embodiment, the processing logic is included in an MFP as described in more detail below.

Referring to FIG. 6, the process begins by processing logic printing one or more document separator pages (processing block 601). The document separator pages may be include preprinted material with corresponding machine-readable information, such as a preprinted title and corresponding machine-readable title (e.g., a bar code title).

After an individual inserts the one or more document separator pages between the documents to be added to a collection and inserts the stack of documents into an automatic document feeder, processing logic receives a request to scan the stack of documents (processing block 602). In one embodiment, at least one of the documents is a multi-page document. In one embodiment, the request to scan the stack of documents is generated in response to a user request to add the documents to a collection. Such a request to add the documents to a collection may be made by pressing a "Create New Collection" button on an MFP.

In response to the request to have multiple documents to be added to one or more collections, processing logic scans the stack of documents (processing block 603).

After scanning, processing logic determines that a document separator page precedes each document (processing block 604). In one embodiment, processing logic reads the machine-readable identifier to identify each document separator page.

Once processing logic determines that a document separator page precedes each document, processing logic processes creates a thumbnail of the first page of each document that immediately follows a document separator page (processing block 605) and for each set of pages following a separator page, creates a single document (processing block 606), and adds the document to the collection (processing block 607).

In one embodiment, processing logic processes each separator page and each corresponding document in order. In so doing, processing logic identifies one document separator page and then creates a single document from the pages following that document separator page until another document separator page is encountered or until no pages remain to be scanned. In one embodiment, after scanning the separator page, if processing logic does not detect other pages following the document separator page, then processing logic waits for pages to be entered into the scanner for scanning.

In one embodiment, processing logic also checkseach document separator sheet for annotations added in predetermined areas and/or machine-readable information corresponding to preprinted information (processing block 608). This information may include titles, notes, or special instructions to the application (e.g., show all pages of this document on the coversheet).

After all documents have been added to the collection, processing logic creates a cover sheet representing the collection (processing block 609). In one embodiment, processing logic creates the cover sheet using the thumbnail and any annotations and/or preprinted information obtained from each document separator page. Thus, one embodiment of the present invention enables the creation of a collection containing thumbnails representing the first pages of documents, which may be identified to the user.

In one embodiment, if no title is included on the separator page, processing logic may request the user enter one using a control input panel.

Lastly, after creating the cover sheet, processing logic prints the cover sheet (processing block 610).

One benefit to using document separator sheets with collections is that alternative representations can be created for each document. For example, a PDF representation of a document may be created as described above. Also, it may be convenient for someone to have access to all of the text printed on the pages of a single document. OCR processing may be performed on all of the pages of a document and the text created as a result of the OCR operation may be stored in a single text file alongside the PDF in the collection. Without separator sheets, either each page would be stored in a separate file, or all pages from all documents would be stored together.

Collection Separators

One convenient feature of MFP collections is the ability to represent hierarchies of collections. One collection can contain one or more subcollections. To add a collection to another collection, in the prior art, a user can place one collection coversheet behind the coversheet of another collection (the container collection), place those collections in the document feeder and press the "Add To Collection" button on the MFP. Thus, two steps are required.

One embodiment of the present invention allows the creation of a hierarchy of collections at a system (e.g., MFP) without creating an intermediate collection coversheet. In one embodiment, collection separator sheets are used to create the hierarchy of collections. The collection separator sheets may include Begin and End Subcollection sheets. The use of Begin and End Subcollection sheets avoids the requirement in the prior art of having to perform at least two separate steps in creating a hierarchy of collections. That is, the use of Begin and End Subcollection sheets avoids having to first create the subcollection and then add the coversheet of the subcollection to another collection in order to add a subcollection to a new collection. In fact, no other existing system allows the creation of a hierarchy of document collections from a single stack of paper.

Figure 8:
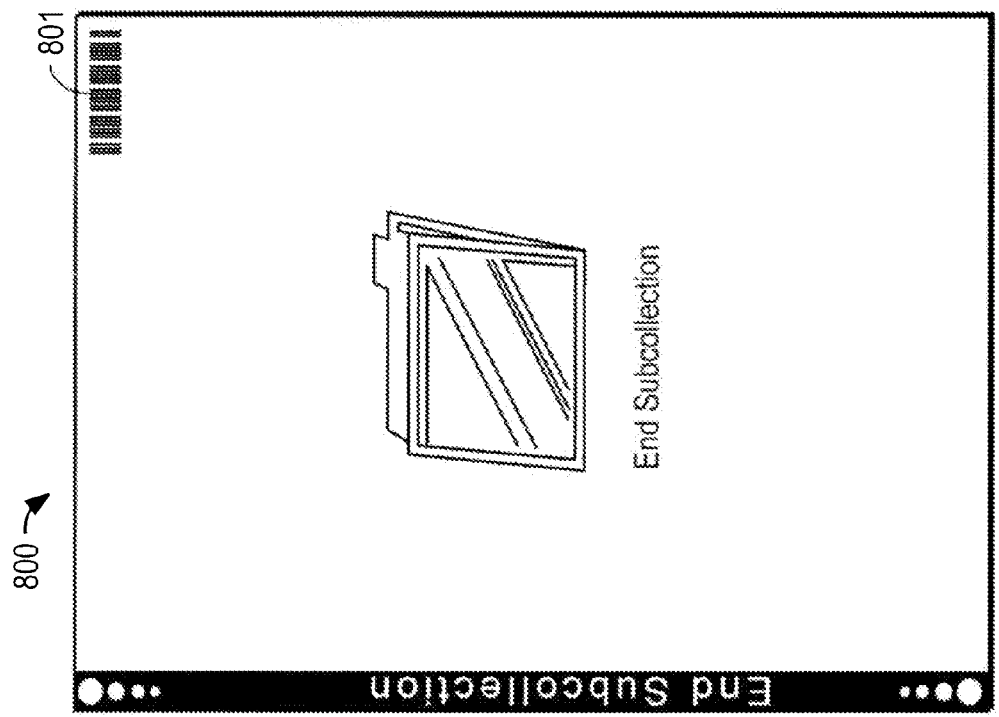
FIGS. 7 and 8 illustrate exemplary Begin Subcollection and End Subcollection separator sheets.
Figure 7:
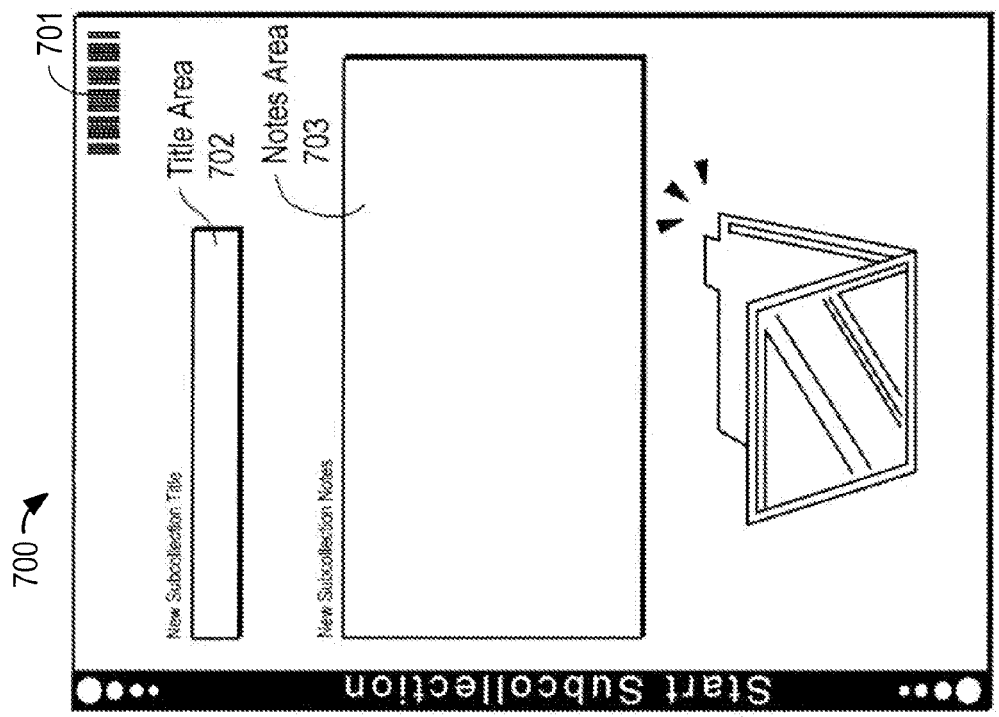

FIGS. 7 and 8 illustrate exemplary Begin Subcollection and End Subcollection separator sheets. The Begin Subcollection separator sheet represents the start of the subcollection, while the End Subcollection separator sheet represents the end of the subcollection. Using a "Begin Subcollection" and its companion "End Subcollection" sheet, it is possible to create a new subcollection in a new collection with a single stack of paper documents. Unlike the document separators, an "end collection" page is required so that the MFP knows on which level of the hierarchy it should be operating. Without "end subcollection" pages, it would be impossible to distinguish between a request to (A) add two subcollections to a single collection or (B) create a three level hierarchical collection. In case (A), the "end subcollection" page comes before the second "begin subcollection" page indicating that documents and subcollections following the page are placed in the top level collection. In case (B), both "end subcollection" pages come at the bottom of the stack of pages, causing the third collection to be placed within the second collection instead of in the top level collection.

Referring to FIGS. 7 and 8, each collection separator page has a machine-readable code (e.g., bar code) in the upper right corner indicating which type of separator page it is. For example, machine-readable (code) separator page indicator 701 of FIG. 701 and machine-readable (code) separator page indicator 801 of FIG. 8 identify the sheets as Begin Subcollection separator sheet 700 and End Subcollection separator sheet 800, respectively. Note that such machine-readable codes, like the document separator pages, may be located anywhere on the page.

In one embodiment, Begin Subcollection separator sheet 700 includes areas to enable a user to annotate the subcollection with a title (title area 702) and/or notes (notes area 703).

Figure 9:
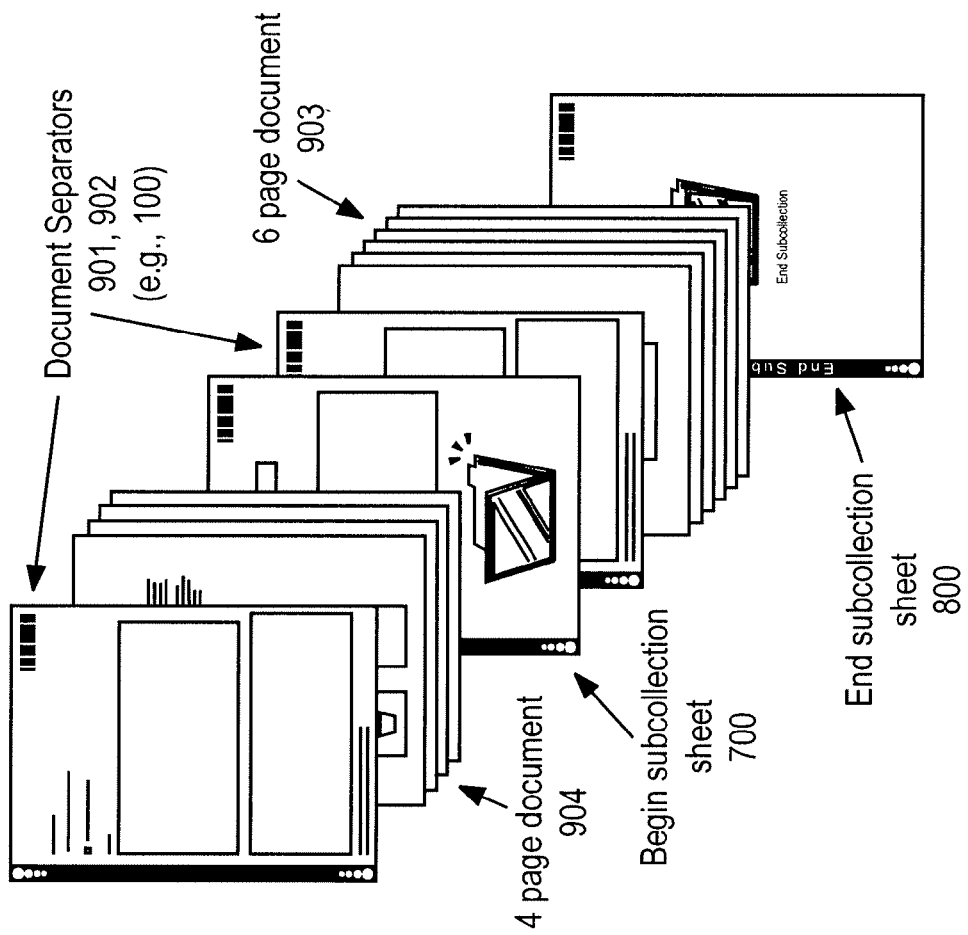
FIG. 9 illustrates a stack of documents that includes the use of document separators and collection separators.

FIG. 9 illustrates a stack of documents that includes the use of document separators and collection separators. Referring to FIG. 9, begin subcollection sheet 700 and end subcollection sheet 800 are used to bracket a set of pages that are to be placed in a separate subcollection. Upon finding "begin subcollection" page 700, the system creates a new collection and places the new collection in the current collection. From that point in time thereafter, all documents and collections are placed in the newly created subcollection until "end subcollection" page 800 is reached. Thus, all of 6-page document 903 identified by document separator page 902 is added to the subcollection.

Figure 10:
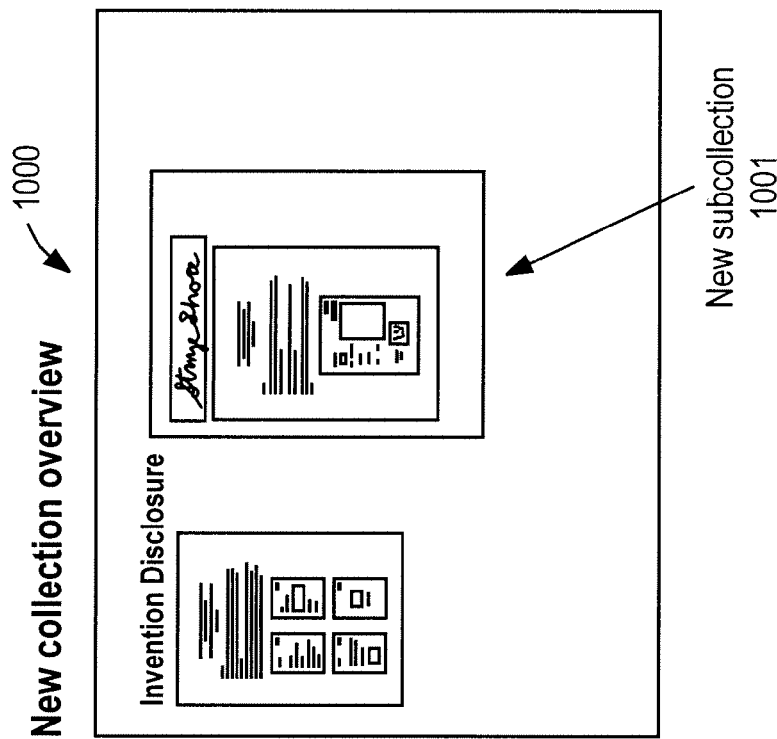
FIG. 10 illustrates the new collection overview corresponding to FIG. 9.

FIG. 10 illustrates the new collection overview corresponding to FIG. 9. Referring to FIG. 10, collection overview 1000 is shown with document 904 (which resulted from the use of document separator 901) and subcollection 1001 that resulted from document 903 (which resulted from the use of document separator 902) and the use of subcollection separator sheets 700 and 800. Thus, the use of collection separators allows for the creation of a hierarchy of documents.

Figure 11:
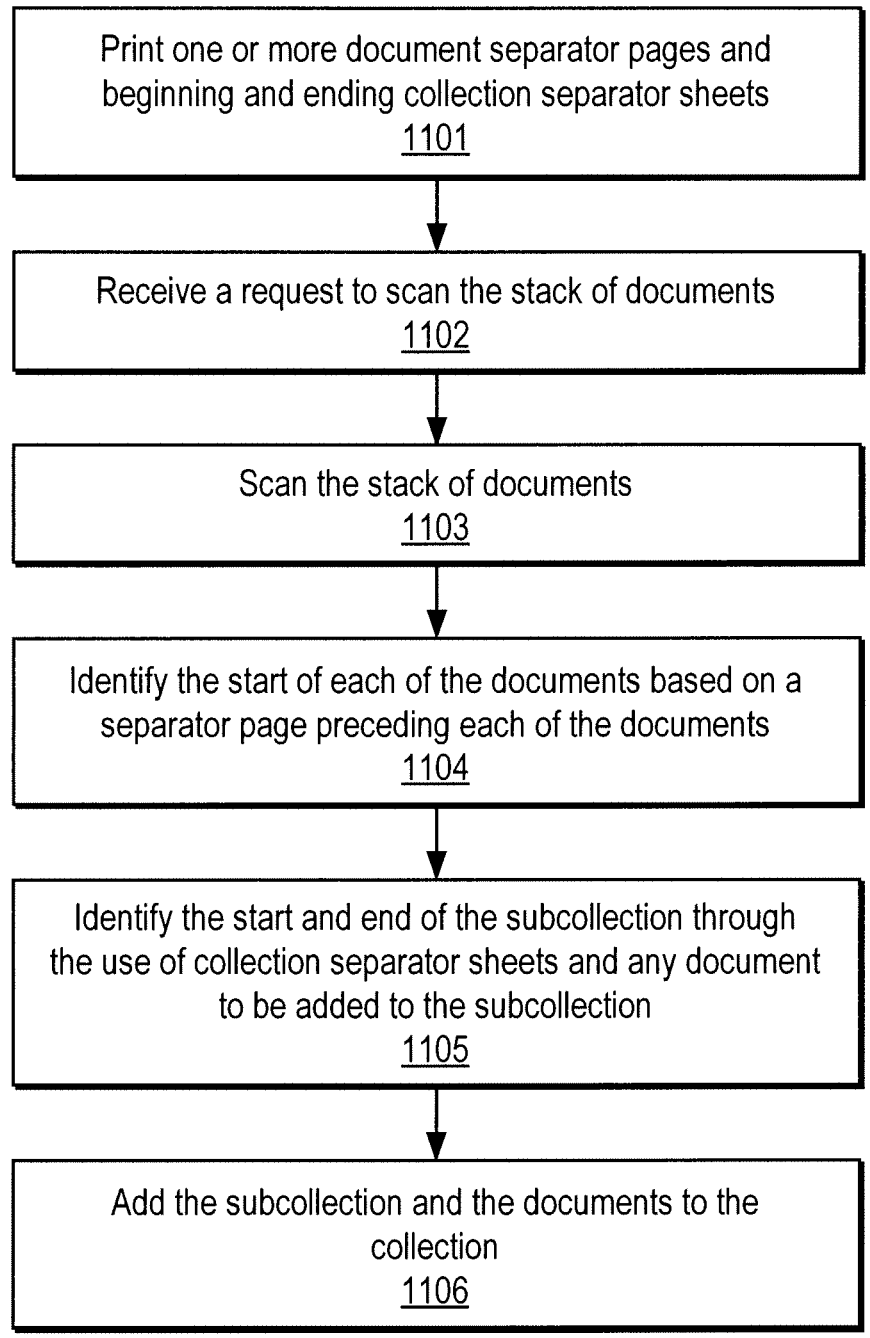
FIG. 11 illustrates another embodiment of a process for adding multiple documents to a collection.

FIG. 11 illustrates another embodiment of a process for adding multiple documents to a collection. The process is performed by processing logic that may comprise hardware (e.g., circuitry, dedicated logic, etc.), software (such as is run on a general purpose computer system or a dedicated machine), or a combination of both. In one embodiment, the processing logic is included in an MFP as described in more detail below.

Referring to FIG. 11, the process begins by processing logic printing one or more document separator pages and beginning and ending collection separator sheets (processing block 1101).

After an individual inserts the one or more document separator pages between the documents to be added to a collection, inserts the collection separator sheets into the stack of documents to mark the starting point and ending point of the documents to be added to the subcollection, the stack of documents is inserted into an automatic document feeder, and processing logic receives a request to scan the stack of documents (processing block 1102). In one embodiment, at least one of the documents is a multi-page document. In one embodiment, the request to scan the stack of documents is generated in response to a user request to add the documents to a collection. Such a request to scan the documents on may be made by pressing a "Create New Collection" button on an MFP.

In response to the request, processing logic scans the stack of documents (processing block 1103) and identifies the start of each of the documents based on a separator page preceding each of the documents (processing block 1104). Processing logic also identifies the start and end of the subcollection through the use of collection separator sheets and any document to be added to the subcollection (processing block 1105). Finally, processing logic adds the subcollection and the documents to the collection (processing block 1106).

Exemplary Systems

Figure 12:
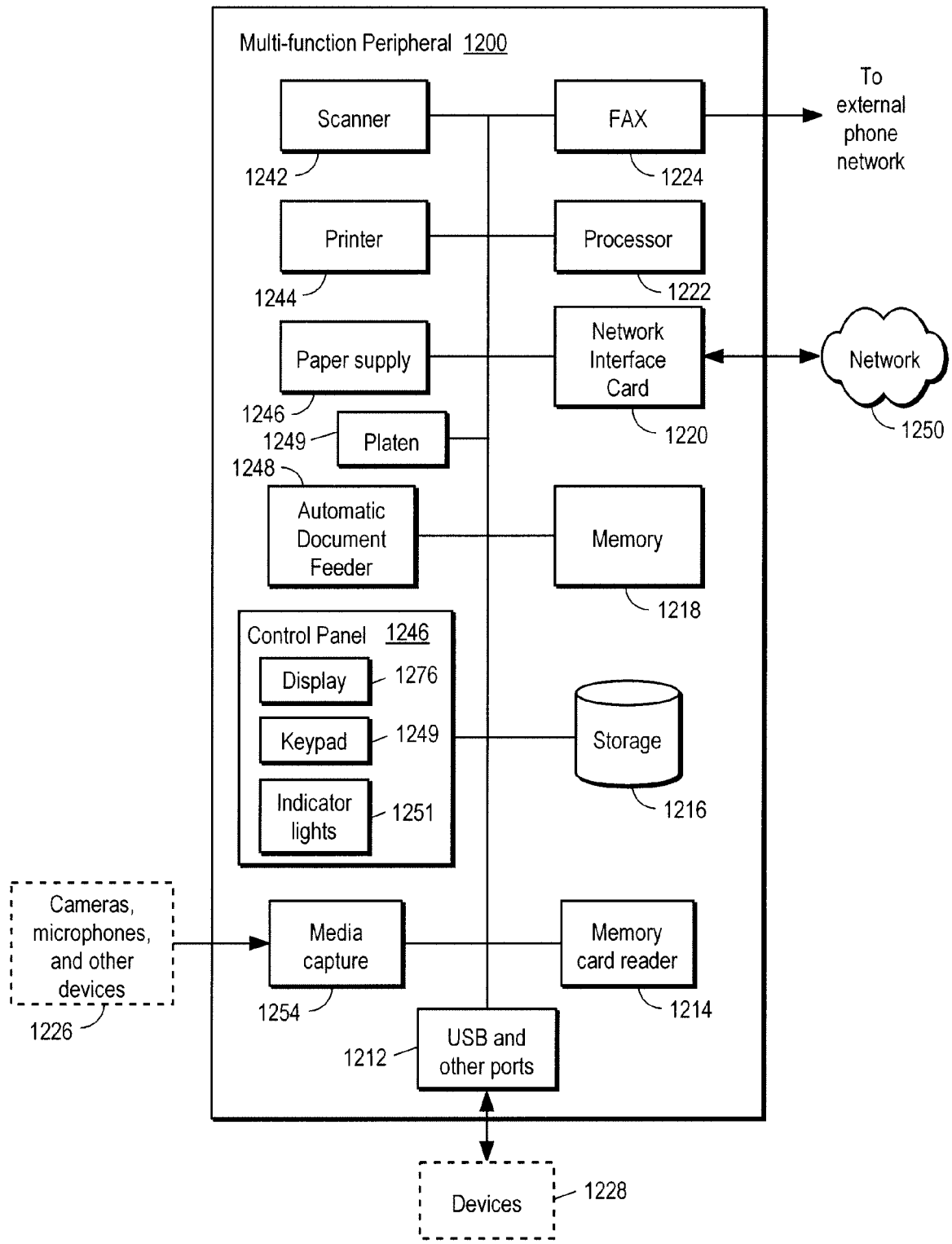
FIG. 12 illustrates an example of a typical MFP.

FIG. 12 is an illustrative example of a typical MFP that may be used to implement one or more operations described herein. Referring to FIG. 12, MFP 1200 is made up of various components, some of which are not required in the operation of each embodiment of the present invention.

MFP 1200 has a scanner 1242 which can image pages of a document and in conjunction with the automatic document feeder 1248 can image multiple pages rapidly. Images of pages can be stored in a non-volatile storage area 1216, which might be a disk drive or in any other memory storage area like the memory 1218.

MFP 1200 also contains a printer or marking mechanism 1244, which can retrieve paper from the paper supply 1246 and print images, which are stored in the memory 1218, storage 1216, obtained directly from the scanner 1242, obtained from the processor 1222 or from the network interface card 1220, which can receive image print requests and images from the external network 1250. Images to be printed can also come from the memory card reader 1214, media capture devices 1226 and 1228 through a media capture port 1254 or a USB or other port 1252. Images can also be received or sent out through the fax interface 1224.

MFP 1200 can access other forms of media through electronic data input peripherals which may include magnetic readers for magnetic media such as floppy disks, magnetic tape, fixed hard disks, removable hard disks, memory cards, and so on. Peripherals may also include optical media readers for optical storage media such as CDs, DVDs, magneto-optical disks, and the like. Information obtained from these peripherals can be incorporated otherwise associated with scanned-in documents to enhance the document content.

Processor 1222 controls the operation of the MFP components shown in FIG. 12. The control panel 1246 having a display 1276, a keypad 1249 and indicator lights 1251 can be used to instruct processor 1222 to use the components of the MFP to make copies, scan documents, perform document processing, such as the processing of document and collector separator sheets as described above, or print faxes. MFPs are available from many companies, including Ricoh Company, Ltd. in Tokyo, Japan, which makes a programmable MFP called the Aficio 2035 S/P, which contains many of the components shown in FIG. 12. Any suitably equipped MFP could be used in practicing this invention.

The memory 1218 of MFP 1200 contains modules that allow the operation of the MFP as well as the practice of the present invention.

Figure 13:
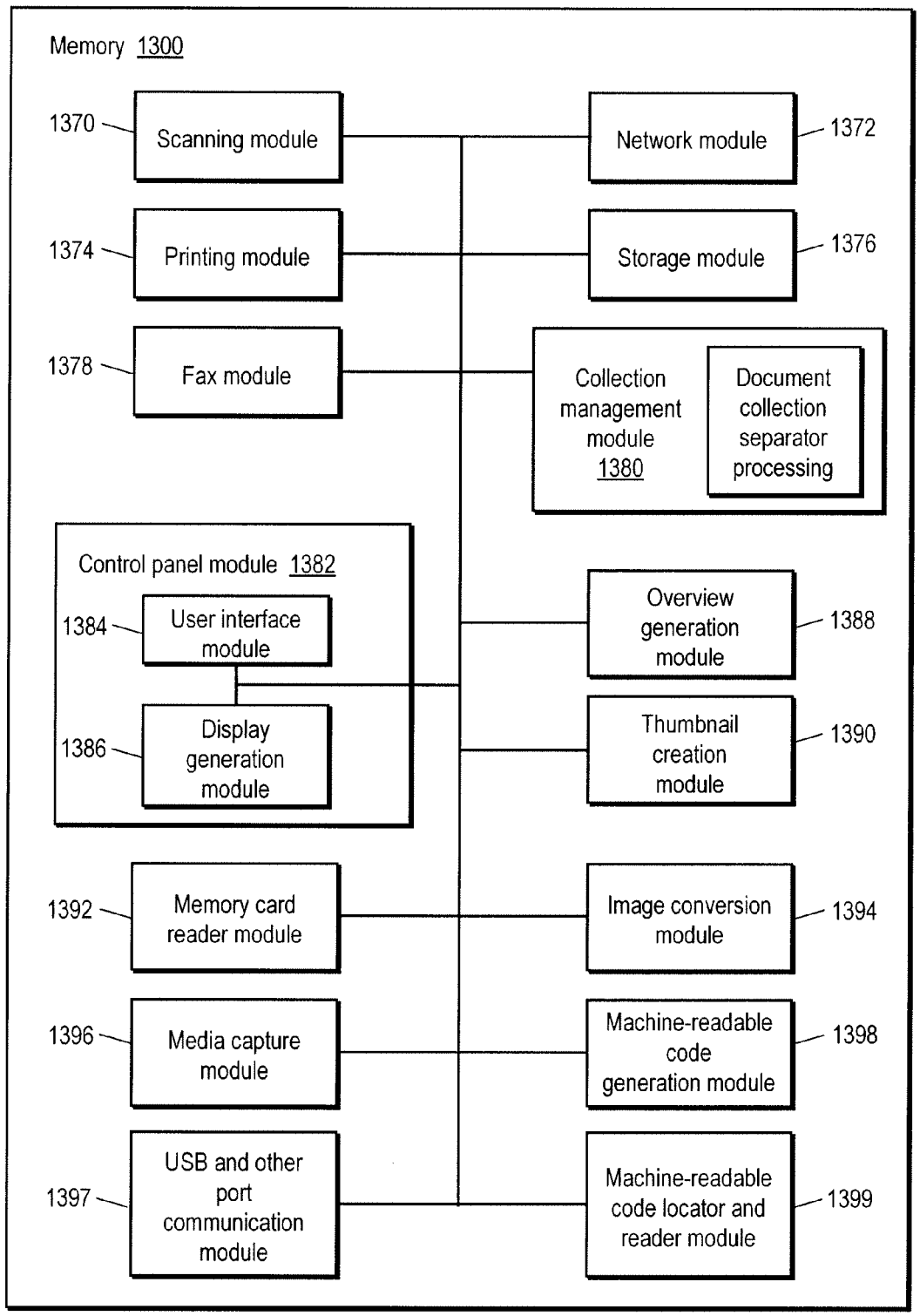
FIG. 13 is a high level representation of various program modules for operating an MFP.

FIG. 13 is a high level representation of various program modules resident in memory 1300 for operating the MFP in accordance with the different aspects of the present invention. The scanning module 1370 contains the instructions that processor 1222 in combination with the scanner 1242 can use to scan pages of documents. The printing module 1374 contains control instructions for receiving an image or a description of an image and driving the printer 1244 causing the image to be printed on a piece of paper. MFPs are known in the art and made by many different companies so a complete description of the operation of the MFP is not necessary. The fax module 1378, network module 1372, storage module 1376, image conversion module 1394, memory card reader module 1392, media capture module 1396, USB and other port communication modules 1397 will not be described because their purpose and function is well understood.

In addition to the typical MFP functions, the following modules are used for the operation of embodiments of the present invention. A collection management module 1380, which includes a document/collection sheet processing submodule, is available, and tells the processor 1222 how to communicate with a collection server maintaining and storing information about the collections and how to create and modify collections, including adding the documents and other media objects, along with subcollections, into a collection.

A thumbnail creation module 1390 can create thumbnail representations of media, including a smaller version of an image, a single-frame from a video or even a waveform from a stored audio signal. These thumbnails are used at least by the overview generation module 1388, which is used to create an overview of a collection. The overview generation module 1388 puts together the thumbnails representing the documents and media into a single image that can be displayed or printed and used for accessing the documents and media.

The machine-readable code generation module 1398 provides the MFP with the ability to create machine-readable codes like barcodes that represent specific collections. The machine-readable code locator/reader module can be used to find and decode machine-readable codes on collection coversheets in order to determine which coversheet was scanned by the scanning mechanism 1242. Preferably, machine-readable codes are barcodes, though there are many ways of creating machine-readable indicia. Barcodes are robust and take up little space and are easily decoded using standard hardware and software. One company that sells software for locating and decoding a variety of barcodes is Tasman Software of Leeds, United Kingdom. Software for creating and printing barcodes can be purchased from IDAutomation.com, Inc. of Tampa, Fla. Decoding machine-readable codes is well known in the industry.

The control panel 1246 is controlled by the processor 1222 using information from the user interface module 1384 and the display generation module 1386, which are part of the control panel module 1382.

Coversheets

A collection coversheet is a piece of paper that represents a collection and, in one embodiment, comprises a header, an identifier printed in a machine-readable format, a collection overview image, optionally, an area in which notes may be written, and optionally a human-readable version of the text encoded in the machine-readable code.

As discussed above, an exemplary cover sheet represents a collection of information. The header contains printed information about the collection. This information may include the author of the collection, a list of zero, one or more people who will be notified if the collection is modified, time and date information about when the collection was last modified or when this coversheet was printed out, and an optional collection topic or subject.

In one embodiment, the machine-readable code contains an encoded version of a unique pointer to the collection on the collection server. In one embodiment, this same pointer when presented in the human-readable form is similar to a uniform resource locator or URL used in the World Wide Web and is referred to herein as a collection identifier, distributed resource identifier, or DRI. In one embodiment, a collection server uses these DRIs as unique collection pointers. In one embodiment, DRIs are globally unique, difficult to guess, and can provide access to collections from anywhere on the Internet.

Within this specification, the terms "collection identifier," "distributed resource identifier," and "DRI" will be used interchangeably and should be understood to mean the same thing—a unique identifier that points to a collection of media and documents stored on a collection server. Also, the identifier might be written in human-readable form or machine-readable form. Both printed forms represent the same identifier and point to the same collection even though they look unlike each other.

In one embodiment, the DRI used for a collection points to a directory that contains the collection of documents as well as information used to build the collection overview and some additional metadata. DRIs can also point directly to an individual file the same way that a URL can point to either a directory or a file.

Since a collection typically comprises a multitude of documents, the DRI is often a directory reference rather than a reference to a particular file. For example, in an OS (operating system) such as Unix, the DRI can be a directory reference such as /usr/collection. Alternatively, the DRI can refer to a file that in turn leads to an identification of the constituent elements of a collection. In still another alternative, the DRI can be a reference to a database that stores the collection.

The text of the DRI may comprise a string of characters that includes a random text component. This randomly (and thus, unguessable) generated text serves to prevent access to a collection because it is virtually impossible to guess.

The example DRI "/root/usr/collection" assumes a single-machine architecture. In a more generalized configuration of two or more machines, the DRI can include a machine name component. For example, a more accessible format such as the URL (universal resource locator) format for identifying World Wide Web (WWW) pages might be suitable. In one embodiment, the DRI constitutes the path portion of the URL. Purely by convention, the path portion uses the following naming format according to a particular embodiment of this aspect of the present invention:

. . . /-DDS-/ORIGIN/ . . . , where DDS is the name of a particular repository of collections, and ORIGIN is the fully qualified hostname of the original server for the collection identified by the DRI.

Thus, for example, a collection may be identified by the following URL:

http://machine1.com/-msg-/machine2.com/2002/1022/298hy9y8h8Ka30eri/1/

The IP address of the machine is identified by "machine1.com." The path portion refers to a collection stored in a repository named "-msg-." The original copy of the collection (i.e., its place of creation) is located on a machine named "machine2.com." Thus, in this case, "machine1" contains a copy of the collection. In one embodiment, collections are contained in directories, though other data storage conventions can be used; e.g., collections can be stored and managed in a database. The collection shown in the example above is stored in a directory called:

"/2002/1022/298hy9y8h8Ka30eri/1/."

The pathname portion "/2002/1022" represents a date; e.g., date of creation of the collection. The string "298hy9y8h8Ka30eri" represents randomly generated text. Finally, as will be discussed below, the directory represented by the terminal pathname "/1/" refers to the first (initial, original, base, etc.) version of the collection.

In one embodiment, both the host machine ("machine1") and the original machine ("machine2") use the following directory structure and URL naming structure. The host machine has a directory called "-msg-" contained in its respective "root" directory for storing collections. The "-msg-" directory has a sub-directory called "machine2.com" which contains all the collections originating on "machine2.com." Generally, a sub-directory is provided for each machine that can be an originator of a collection.

Given the DRI, a person or machine will have enough information to access the collection in order to add to or modify the collection.

Using a bar code representation of a DRI allows for automated access to the collection without requiring the user to manually enter the location. It can be appreciated of course that any machine-readable indicium can be used instead of a bar code system, including optical character recognition (OCR) of the human-readable DRI.

Using the MFP and/or the processing logic and the techniques described herein, it is possible to create and modify collections on a collection server, including adding a multi-page document to a collection. A new, empty collection can be created. A new non-empty collection can be created using available documents and media. Electronic media and paper documents can be added to existing collections. A collection can be printed. Collections can be added to or merged. Also, actions can be taken on individual media in a collection using notes or actions selected on the coversheet.

In one embodiment, scalable vector graphics files or SVG files are used to represent the collection overview. SVG files are a standard way of creating a visual representation on the World Wide Web and there are many viewers and tools for creating SVG. A collection preferably includes a specially name SVG file which can be used to construct an overview image for the coversheet or any display. In one embodiment, the SVG file includes information for displaying the thumbnails of individual documents and media stored in the collection.

Metadata about the individual files in the collection and their relationship to other files in the collection is stored preferably in an XML (extensible markup language) file. In one embodiment, this information includes image width and height, links between images and their thumbnails and links between a document and an image representing that document. The exact format is unimportant as long as the collection server understands how to read and write the format.

Additional information related to the collection as a whole can also be stored in the metadata file. This information might include the time at which the message was created, the subject of the message, the name of the author of the collection, and contact information such as email addresses, fax numbers, etc. belonging to those who should be notified when a collection is altered.

While creating a new collection, either a printout is generated or the information about the new collection, including at least the DRI is emailed or faxed to someone. Otherwise, the DRI will be lost to all but the collection server and will not be available for inspecting or for adding documents because no one will have or be able to guess the DRI.

The MFP contacts the collection server through a network to request a new collection identifier or DRI. It should be understood that it is possible for the MFP to request identifiers in advance so that if the collection server is busy or temporarily offline, the MFP can still create new collections. It is clear to those skilled in the art that an MFP can embody a collection server because the MFP contains hardware and software modules substantially similar to those required by the server.

If the coversheet is to be printed, then the MFP composes a coversheet. In one embodiment, a header block is created including at least the date and time of the creation of the new collection. The DRI or identifier obtained from the collection server is added to the coversheet at the bottom in human-readable form and then encoded in an industry standard barcode such as a QRCode in one embodiment and added to the upper right-hand corner of the coversheet. An SVG representing the overview is converted to image form and added to the appropriate place in the coversheet. Additional information might also be added as deemed appropriate. The composition of the coversheet described here is one possibility but those skilled in the art will recognize that there are many ways to lay out or compose a coversheet that are within the scope of this invention.

The task of adding to an existing collection requires a collection to exist. In one embodiment, to add to that collection at the MFP, the user uses a coversheet from the existing collection. As mentioned, each collection identifier represents a single collection but collections can change over time. In one embodiment, each time a collection changes, the last path element in the DRI is modified. Those who have access to a single collection are thereby easily given access to all versions of that collection. In one embodiment, the version name or final pathname of /0/ has a special significance and means the "latest" or "most recently created" version.

In one embodiment, pathname/1/ indicates the first version of the collection, /2/ represents the second version, etc. When a new collection is uploaded to the collection server, a new directory using the next integer is created. The next collection after /2/ would preferably be called /3/. In order to maintain unique version numbers, it is essential that only one device, i.e., the collection server, create the version number of the final pathname. The version number cannot be created by the MFP because multiple MFPs might generate a number at the same time and choose the same name. Instead, the MFPs create a collection and upload it to a temporary directory on the collection server and when everything is uploaded, the collection server moves it into place and assigns the final pathname.

A brief description of the process of creating a collection will be described. If the user has paper documents, they can be placed on an automatic document feeder. If the user has images or other documents in a memory card or some other media, the media can be placed in the appropriate reader.

If the user wishes to create some electronic media at the time of the creation of a new collection, the user records audio, video, still images, or other electronic media using any of the microphone, a digital camera, video camera, or other media-capturing device may be used.

The MFP can recognize that a page containing a DRI represents a collection. Putting a page with a DRI into any collection, new or existing, could be understood as a request to add that collection to the new collection. In other words, the page containing the DRI represents a request to add the collection pointed to by that DRI to the new collection. The overview image of that collection will be retrieved and added as a thumbnail to the new collection and the subject of that collection will be used as the title for the thumbnail.

In a new collection, one or more new identification numbers are requested and received from the collection server. In one embodiment, only a single collection identifier is needed for a new collection.

Each document or page that was found to contain a DRI in machine-readable form is replaced with an image representing the collection pointed to by that DRI.

In one embodiment, a thumbnail is created for each page or document or other media. The thumbnail is preferably a smaller version of the page that is similar in appearance but smaller in storage size and in number of pixels. With recorded audio, a thumbnail is just a representation of the audio and could be a waveform or even a standard computer icon representing the audio. In the preferred embodiment, the audio could be displayed as a rectangle containing a waveform whose shape is based on the audio content and whose length corresponds to the duration of the audio recording. A video thumbnail could be a single frame or a small number of representative frames from the video composited into a single small image. Those who are skilled in the art will understand that there are many various ways of creating thumbnails to represent media. Each collection coversheet was replaced with a collection overview image that is now reduced to form a thumbnail.

All of the media and documents for the new collection are now added to the collection, which means that they are uploaded to the collection server and placed in the directory pointed to by the DRI of the new collection. There are many well-known protocols for uploading files to a server, including FTP, SCP, HTTP PUT. Preferably, the HTTP PUT protocol is used which allows the MFP to specify the location and contents of each media file as it is being uploaded.

The thumbnails representing the new media items are arranged in the collection overview. The thumbnails are placed in an appropriate manner within the overview, expanding the overview size if necessary.

The SVG file representing the overview is written and uploaded to the collection server and all of the thumbnails are uploaded.

The size of the thumbnail to be added to the overview is determined. Thumbnail sizes are usually measured in pixels. Often thumbnails are chosen to be some standard size—chosen so that they neither the width nor height is larger than a certain maximum size—perhaps 150 pixels for standard display resolutions or two inches for printed thumbnails. Since some images might have a very large or very small aspect ratio. It might be more appropriate to limit the thumbnail to a maximum area—square pixels or square inches—rather than a maximum width and height.

Scaling an image so that it contains no more than some total number of pixels instead of restricting the width and height to be less than some maximum improves the overall appearance of the thumbnails and is the preferred method of selecting a thumbnail size. However, any method for choosing thumbnail sizes can be used for the present invention.

Each thumbnail is placed preferably in a non-overlapping position in the overview.

All new thumbnails are uploaded to the collection server as well as the new overview description file and metadata file.

Modifying the overview could be accomplished using an object-based drawing tool like those available in Microsoft's PowerPoint software or Adobe Illustrator or similar tools. These tools and techniques are well understood by those skilled in the art.

All modified information is sent to the collection server, including the metadata files, SVG overview file, and any changes in the collection.

The user may bring media to the MFP or creates it using media recording devices or the like connected to the MFP or to the network.

The advantage of having a machine-readable collection identifier on a coversheet is that the MFP or any device that can locate and decode machine-readable codes can determine which collection is represented by the coversheet. The user can indicate which collection the new media will be added to by typing in a collection identifier or DRI but this can be a difficult task because DRIs tend to be long random strings of characters. DRI's can be located and decoded from a scanned image or read using handheld barcode scanners if they are encoded in barcode format. Handheld scanners which read many different types of one and two-dimensional barcodes are available from many companies like Hewlett-Packard Company of Palo Alto, Calif., USA. They can also be read in text form using optical character recognition technology or decoded from a magnetic strip if properly encoded. If a coversheet of the collection is available, the coversheet should be placed on the MFP where it can be scanned, either in the automatic document feeder or directly on the glass platen. Alternatively, the barcode can be scanned using a handheld scanner. If the barcode has been captured in a digital image, perhaps using a digital camera, the camera can be directly connected to the MFP or a memory card from the camera can be plugged into a card reader. There are many other methods for presenting the MFP with a machine-readable DRI and those methods and techniques are not enumerated herein because they are understood by those skilled in the art.

In one embodiment, a machine-readable DRI is presented as part of the coversheet of the collection. In one embodiment, the DRI is contained in a QRCode barcode on the coversheet and the coversheet is placed on an automatic document feeder (ADF) of the MFP. Additional documents or pages to be added to the collection are placed behind the coversheet. The additional pages can be any document pages or they can be coversheets of other messages. Multi-page documents can be separated by document separators.

Each of the documents and media is searched for a machine-readable DRI. When a bar-coded DRI is scanned using a handheld scanner, the DRI can be stored in the memory of the MFP so that it can be accessed when it is time to determine which collection to add the new media to. If the ADF or a platen has been used to scan in a coversheet or if the DRI is contained in an image from the digital camera, the DRI will have to be read from the scanned or captured image. Either source of a DRI is acceptable and typically, if there is no DRI held in a memory due to hand scanning of a coversheet, the first scanned sheet or first image will contain the DRI. Those skilled in the art will recognize that there are many ways of providing the DRI to the MFP an exhaustive list need not be provided.

All image-based media including images that are scans of document pages are searched for machine-readable codes. Typically, when adding a page or document to a collection, the image of that page is added to the collection storage area and a thumbnail is added to the overview. If that page happens to contain a machine-readable DRI then based on the users preference, instead of adding the page to the collection, the collection that the DRI represents can be added to the collection. For each page or image containing a DRI, the "page add" request is converted into a "collection add" request with the appropriate DRI representing the collection.

Thumbnails are created for all of the new images, documents, pages, and media. For those pages that represent other collections, thumbnails are made for the collections instead of the page. All collected media is uploaded to the collection server.

It is important that the existing collection be changed in a way that makes the current state or version of the collection available at a later time. The new media should not be placed in the same storage area as the existing collection in a way that overwrites the existing collection.

Typically, new media and thumbnails in a collection are uploaded to a staging area on the collection server. The staging area is associated with the collection identifier but doesn't have a permanent final pathname. As soon as all of the information has been uploaded and is complete, the collection server moves the collection into a final directory or storage area with a permanent final pathname. The permanent final pathname is usually the next integer after the most recently uploaded collection.

The thumbnails representing the new media are added to the collection overview.

The thumbnails, metadata, and the overview SVG file, are uploaded to the staging area in the collection server. All changes and modifications are finally uploaded to the collection server and at this point, the server has everything required to move the collection out of the staging area and into the final directory upon assigning a version number.

A collection server can keep a mapping of collection identifiers to collection directories.

An Exemplary Computer System

Figure 14:
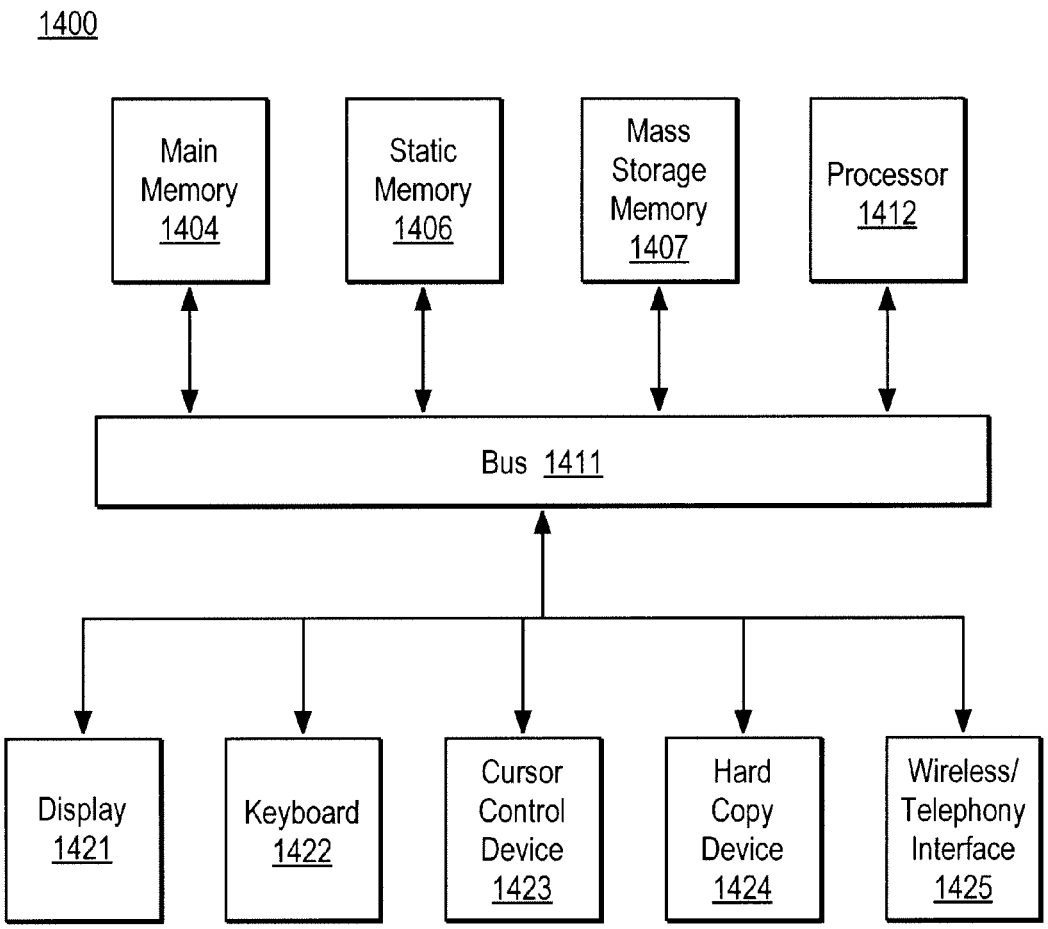
FIG. 14 is a block diagram of an exemplary computer system.

FIG. 14 is a block diagram of an exemplary computer system that may perform one or more of the operations described herein. Referring to FIG. 14, computer system 1400 may comprise an exemplary client or server computer system. Computer system 1400 comprises a communication mechanism or bus 1411 for communicating information, and a processor 1412 coupled with bus 1411 for processing information. Processor 1412 includes a microprocessor, but is not limited to a microprocessor, such as, for example, Pentium™, PowerPC™, Alpha™, etc.

System 1400 further comprises a random access memory (RAM), or other dynamic storage device 1404 (referred to as main memory) coupled to bus 1411 for storing information and instructions to be executed by processor 1412. Main memory 1404 also may be used for storing temporary variables or other intermediate information during execution of instructions by processor 1412.

Computer system 1400 also comprises a read only memory (ROM) and/or other static storage device 1406 coupled to bus 1411 for storing static information and instructions for processor 1412, and a data storage device 1407, such as a magnetic disk or optical disk and its corresponding disk drive. Data storage device 1407 is coupled to bus 1411 for storing information and instructions.

Computer system 1400 may further be coupled to a display device 1421, such as a cathode ray tube (CRT) or liquid crystal display (LCD), coupled to bus 1411 for displaying information to a computer user. An alphanumeric input device 1422, including alphanumeric and other keys, may also be coupled to bus 1411 for communicating information and command selections to processor 1412. An additional user input device is cursor control 1423, such as a mouse, trackball, trackpad, stylus, or cursor direction keys, coupled to bus 1411 for communicating direction information and command selections to processor 1412, and for controlling cursor movement on display 1421.

Another device that may be coupled to bus 1411 is hard copy device 1424, which may be used for marking information on a medium such as paper, film, or similar types of media. Another device that may be coupled to bus 1411 is a wired/wireless communication capability 1425 to allow communication to a network, phone system or other devices.

Note that any or all of the components of system 1400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

We claim:

1. A method comprising:
a scanning unit for scanning a plurality of sheets having a plurality of documents to be added to one or more collections; identifying the start of each of the plurality of documents based on a separator page preceding each of the plurality of documents; and adding the plurality of documents to the one or more collections.

2. The method defined in claim 1 wherein adding the plurality of documents to the one or more collections comprises adding the plurality of documents to a single collection.

3. The method defined in claim 1 wherein the separator page includes a machine-readable identifier, and wherein identifying the start of each of the plurality of documents based on a separator page preceding each of the plurality of documents comprises:
   reading the machine-readable identifier; and
   identifying the separator page based on the machine-readable identifier.

4. The method defined in claim 3 wherein the machine-readable identifier comprises a bar code.

5. The method defined in claim 1 further comprising identifying one separator page as a collection separator page, and wherein adding the plurality of documents to the one or more collections comprises adding two of the plurality of documents to different collections based on identification of the one separator page as a collection separator page.

6. The method defined in claim 5 wherein the different collections are in a hierarchy.

7. The method defined in claim 5 wherein the different collections include a first collection in a second collection, wherein one of the two documents is added to the first collection and the other of the two documents is added to the second collection.

8. The method defined in claim 5 wherein the collection separator page includes a machine-readable identifier, and wherein identifying the start of each of the plurality of documents based on a separator page preceding each of the plurality of documents comprises:
   reading the machine-readable identifier; and
   identifying the separator page based on the machine-readable identifier.

9. The method defined in claim 8 wherein the machine-readable identifier comprises a bar code.

10. The method defined in claim 1 further comprising: creating a cover sheet representing one of the one or more collections; and printing the cover sheet.

11. The method defined in claim 1 wherein the separator page includes at least one area for user input, and further comprising:
   scanning the at least one area to obtain scanned data; and
   adding the scanned data to the collection.

12. The method defined in claim 11 wherein the at least one area comprises one or more selected from a group consisting of a title entry area and a note entry area.

13. The method defined in claim 1 wherein the separator page includes machine-readable information, and further comprising:
   scanning the machine-readable information; and
   adding information corresponding to the machine-readable information to the collection.

14. The method defined in claim 1 wherein at least one of the plurality of documents is a multi-page document.

15. The method defined in claim 1 wherein the collection comprises one or more media objects.

16. An article of manufacture having a computer-readable medium with instructions stored thereon which, when executed by a system, cause the system to perform operations comprising:
   scanning a plurality of sheets having a plurality of documents to be added to one or more collections;
   identifying the start of each of the plurality of documents based on a separator page preceding each of the plurality of documents; and
   adding the plurality of documents to the one or more collections.

17. The article of manufacture defined in claim 16 wherein adding the plurality of documents to the one or more collections comprises adding the plurality of documents to a single collection.

18. The article of manufacture defined in claim 16 wherein the separator page includes a machine-readable identifier, and wherein identifying the start of each of the plurality of documents based on a separator page preceding each of the plurality of documents comprises:
   reading the machine-readable identifier; and
   identifying the separator page based on the machine-readable identifier.

19. The article of manufacture defined in claim 18 wherein the machine-readable identifier comprises a bar code.

20. The article of manufacture defined in claim 16 further comprising instructions that cause the system to perform operations comprising identifying one separator page as a collection separator page, and wherein adding the plurality of documents to the one or more collections comprises adding two of the plurality of documents to different collections based on identification of the one separator page as a collection separator page.

21. The article of manufacture defined in claim 20 wherein the different collections are in a hierarchy.

22. The article of manufacture defined in claim 20 wherein the different collections include a first collection in a second collection, wherein one of the two documents is added to the first collection and the other of the two documents is added to the second collection.

23. The article of manufacture defined in claim 20 wherein the collection separator page includes a machine-readable identifier, and wherein identifying the start of each of the plurality of documents based on a separator page preceding each of the plurality of documents comprises:
   reading the machine-readable identifier; and
   identifying the separator page based on the machine-readable identifier.

24. The article of manufacture defined in claim 23 wherein the machine-readable identifier comprises a bar code.

25. The article of manufacture defined in claim 16 further comprising instructions to cause the system to perform operation comprising creating a cover sheet representing one of the one or more collections; and printing the cover sheet.

26. The article of manufacture defined in claim 16 wherein the separator page includes at least one area for user input, and further comprising instructions to cause the system to perform operations comprising
   scanning the at least one area to obtain scanned data; and
   adding the scanned data to the collection.

27. The article of manufacture defined in claim 26 wherein the at least one area comprises one or more selected from a group consisting of a title entry area and a note entry area.

28. The article of manufacture defined in claim 16 wherein the separator page includes machine-readable information, and further comprising instructions that cause the system to perform operations comprising
   scanning the machine-readable information; and
   adding information corresponding to the machine-readable information to the collection.

29. The article of manufacture defined in claim 16 wherein at least one of the plurality of documents is a multi-page document.

30. The article of manufacture defined in claim 16 wherein the collection comprises one or more media objects.

31. An apparatus comprising:
   means for scanning a plurality of sheets having a plurality of documents to be added to one or more collections;
   means for identifying the start of each of the plurality of documents based on a separator page preceding each of the plurality of documents; and
   means for adding the plurality of documents to the one or more collections.

32. A method comprising: A multi-function peripheral device for identifying a start and an end of a sub-collection through the use of collection separator sheets; and adding the sub-collection and the plurality of documents to the collection.

33. The method defined in claim 32 further comprising:
   scanning a plurality of sheets having a plurality of documents to be added to a collection;
   identifying the start of each of the plurality of documents based on a separator page preceding each of the plurality of documents; and
   adding the plurality of documents to the collection.

34. An article of manufacture having media computer-readable medium with instructions stored thereon which, when executed by a system, cause the system to perform operations comprising:

identifying a start and an end of a subcollection through the use of collection separator sheets; and adding the subcollection to the collection.

35. The article of manufacture defined in claim 34 further comprising instructions that cause the system to perform operations comprising scanning a plurality of sheets having a plurality of documents to be added to a collection;

identifying the start of each of the plurality of documents based on a separator page preceding each of the plurality of documents; and adding the plurality of documents to the collection.

* * * * *

UNITED STATES PATENT AND TRADEMARK OFFICE
CERTIFICATE OF CORRECTION

PATENT NO. : 7,580,164 B2 Page 1 of 1
APPLICATION NO. : 11/023208
DATED : August 25, 2009
INVENTOR(S) : Barrus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this

Fourteenth Day of September, 2010

David J. Kappos
*Director of the United States Patent and Trademark Office*